United States Patent [19]

Sako

[11] Patent Number: 5,455,814
[45] Date of Patent: Oct. 3, 1995

[54] DATA RECORDING METHOD

[75] Inventor: Yoichiro Sako, Chiba, Japan

[73] Assignee: Sony Corporation, Japan

[21] Appl. No.: 184,779

[22] Filed: Jan. 21, 1994

Related U.S. Application Data

[63] Continuation of Ser. No. 856,663, Mar. 24, 1992, abandoned.

[30] Foreign Application Priority Data

Mar. 28, 1991 [JP] Japan ................................. 3-065015

[51] Int. Cl.$^6$ .................................................. G11B 7/013
[52] U.S. Cl. ................................ 369/59; 369/85; 360/48; 360/13
[58] Field of Search ................................ 369/59, 60, 85; 360/48, 13

[56] References Cited

U.S. PATENT DOCUMENTS

| | | | |
|---|---|---|---|
| 4,211,997 | 7/1980 | Rudnick et al. | 369/59 |
| 4,472,750 | 9/1984 | Klumpp et al. | 360/78.01 |
| 4,800,550 | 1/1989 | Yamauchi | 369/59 |
| 5,050,171 | 9/1991 | Ishijima | 371/47.1 |
| 5,200,943 | 4/1993 | Sano et al. | 369/59 |

FOREIGN PATENT DOCUMENTS

| | | |
|---|---|---|
| 0258059A2 | 3/1988 | European Pat. Off. . |
| 2627618A1 | 1/1977 | Germany . |
| 2187008 | 8/1987 | United Kingdom . |
| WO89/07825 | 8/1989 | WIPO . |

OTHER PUBLICATIONS

*Fundamentals of Data Structures*, Hurowitz and Sahni, 1977 pp. 178–183.

Y. Sako et al., "Data Structure of the Compact Disk–Read–Only Memory System," Applied Optics, vol. 25, No. 22, Nov. 15, 1986, pp. 3996–4000.

C. L. Cohen, "Laser Disks May be Used as Computer ROMs," Electronics Apr. 19, 1984, pp. 85–86.

*Primary Examiner*—Aristotelis Psitos
*Assistant Examiner*—Duncan Wilkinson
*Attorney, Agent, or Firm*—Limbach & Limbach; Charles P. Sammut

[57] ABSTRACT

A data recording method by which data of a compact disk can be recorded well onto a magneto-optic disk of the ISO format. Data of a compact disk are recorded onto a 5-inch magneto-optic disk (ISO format) of the 512 bytes/sector type of the CS system. The sector size of the magneto-optic disk is 610 bytes. Data included in one sector (98 frames) of the compact disk are 2,352 bytes and subcodings of P to W are 96 bytes. Data for one sector are divided into data groups A to H to construct a data format. A CRC is added to each data group. Further, a parity 2 (Reed-Solomon code) is added. Data (3,050 bytes) for one sector of the compact disk to which the CRCs, parities and so forth are added are recorded across 5 sectors of the magneto-optic disk. Data of a compact disk can be recorded onto a magneto-optic disk having a different sector size, and since error correction codes or error detection codes are added using the remaining area, the data can be recorded with a high degree of accuracy.

11 Claims, 7 Drawing Sheets

COLUMN No. j →

| | 0 | 1 | 2 | 3 | 4 | ROW No. i |
|---|---|---|---|---|---|---|
| SB1 SB2 SB3 | D1 | D2 | D3 | D4 | D5 | 105 |
| | D6 | D7 | D8 | D9 | D10 | 104 |
| | D11 | D12 | D13 | D14 | D15 | 103 |
| RS1 | D16 | D17 | D18 | D19 | D20 | 102 |
| | D21 | D22 | D23 | D24 | D25 | 101 |
| | | | | | | |
| RS2 | | | | | | |

106 ROWS

| | 0 | 1 | 2 | 3 | 4 | |
|---|---|---|---|---|---|---|
| RS33 | | | | | | |
| | D501 | D502 | D503 | D504 | D505 | 5 |
| | D506 | D507 | D508 | D509 | D510 | 4 |
| RS34 | D511 | D512 | P1,1 | P1,2 | P1,3 | 3 |
| | P1,4 | P2,1 | P2,2 | P2,3 | P2,4 | 2 |
| | P3,1 | P3,2 | P3,3 | P3,4 | (FF) | 1 |
| RS35 | (FF) | C1 | C2 | C3 | C4 | 0 |

| | | | | | | |
|---|---|---|---|---|---|---|
| | E1,1 | E2,1 | E3,1 | E4,1 | E5,1 | -1 |
| | E1,2 | E2,2 | E3,2 | E4,2 | E5,2 | -2 |
| RS36 | E1,3 | E2,3 | E3,3 | E4,3 | E5,3 | -3 |
| | E1,4 | E2,4 | E3,4 | E4,4 | E5,4 | -4 |

16 ROWS

PARITY GENERATING DIRECTION ↑

| | | | | | | |
|---|---|---|---|---|---|---|
| RS40 | E1,15 | E2,15 | E3,15 | E4,15 | E5,15 | -15 |
| | E1,16 | E2,16 | E3,16 | E4,16 | E5,16 | -16 |

← R/W DIRECTION

| FRAME | | | | | | | | |
|---|---|---|---|---|---|---|---|---|
| 1 | | | | So | | | | |
| 2 | | | | S1 | | | | |
| 3 | P1 | Q1 | R1 | S1 | T1 | U1 | V1 | W1 |
| 4 | P2 | Q2 | R2 | S2 | T2 | U2 | V2 | W2 |
| 5 | | | | | | | | |
| 6 | | | | | | | | |
| ⋮ | | | | | | | | |
| 95 | P93 | Q93 | R93 | S93 | T93 | U93 | V93 | W93 |
| 96 | P94 | Q94 | R94 | S94 | T94 | U94 | V94 | W94 |
| 97 | P95 | Q95 | R95 | S95 | T95 | U95 | V95 | W95 |
| 98 | P96 | Q96 | R96 | S96 | T96 | U96 | V96 | W96 |
| 1 | | | | SO | | | | |
| 2 | | | | S1 | | | | |
| | P1 | Q1 | R1 | S1 | T1 | U1 | V1 | W1 |
| | P2 | Q2 | R2 | S2 | T2 | U2 | V2 | W2 |

SO= 0 0 1 0 0 0 0 0 0 0 0 0 0 1
S1= 0 0 0 0 0 0 0 0 0 1 0 0 1 0

BEFORE DEMODULATION
(OUT OF RULE OF EFM)

| COMBINATION | n | m | REMAINING BYTE |
|---|---|---|---|
| a − b | 6 | 1 | 6a − b = 426 BYTES |
| a − b' | 5 | 1 | 5a − b' = 602 BYTES |
| a − b" | 5 | 1 | 5a − b" = 698 BYTES |
| a' − b | 7 | 1 | 7a' − b = 476 BYTES |
| a' − b' | 5 | 1 | 5a' − b' = 202 BYTES |
| a' − b" | 5 | 1 | 5a' − b" = 298 BYTES |
| a" − b | 7 | 1 | 7a" − b = 350 BYTES |
| a" − b' | 5 | 1 | 5a" − b' = 112 BYTES |
| a" − b" | 5 | 1 | 5a" − b" = 208 BYTES |

$$a = 610 \text{ BYTES}$$
$$a' = 530 \text{ BYTES}$$
$$a" = 512 \text{ BYTES}$$
$$b = 3234 \text{ BYTES}$$
$$b' = 2448 \text{ BYTES}$$
$$b" = 2352 \text{ BYTES}$$

DATA RECORDING METHOD

This is a continuation of application Ser. No. 07/856,663 filed on Mar. 24, 1992, now abandoned.

BACKGROUND OF THE INVENTION

1. Field of the Invention

This invention relates to a data recording method suitably applied to record data of a compact disk format onto a magneto-optic disk, for example, of the ISO format.

2. Description of the Related Art

Figure 1:
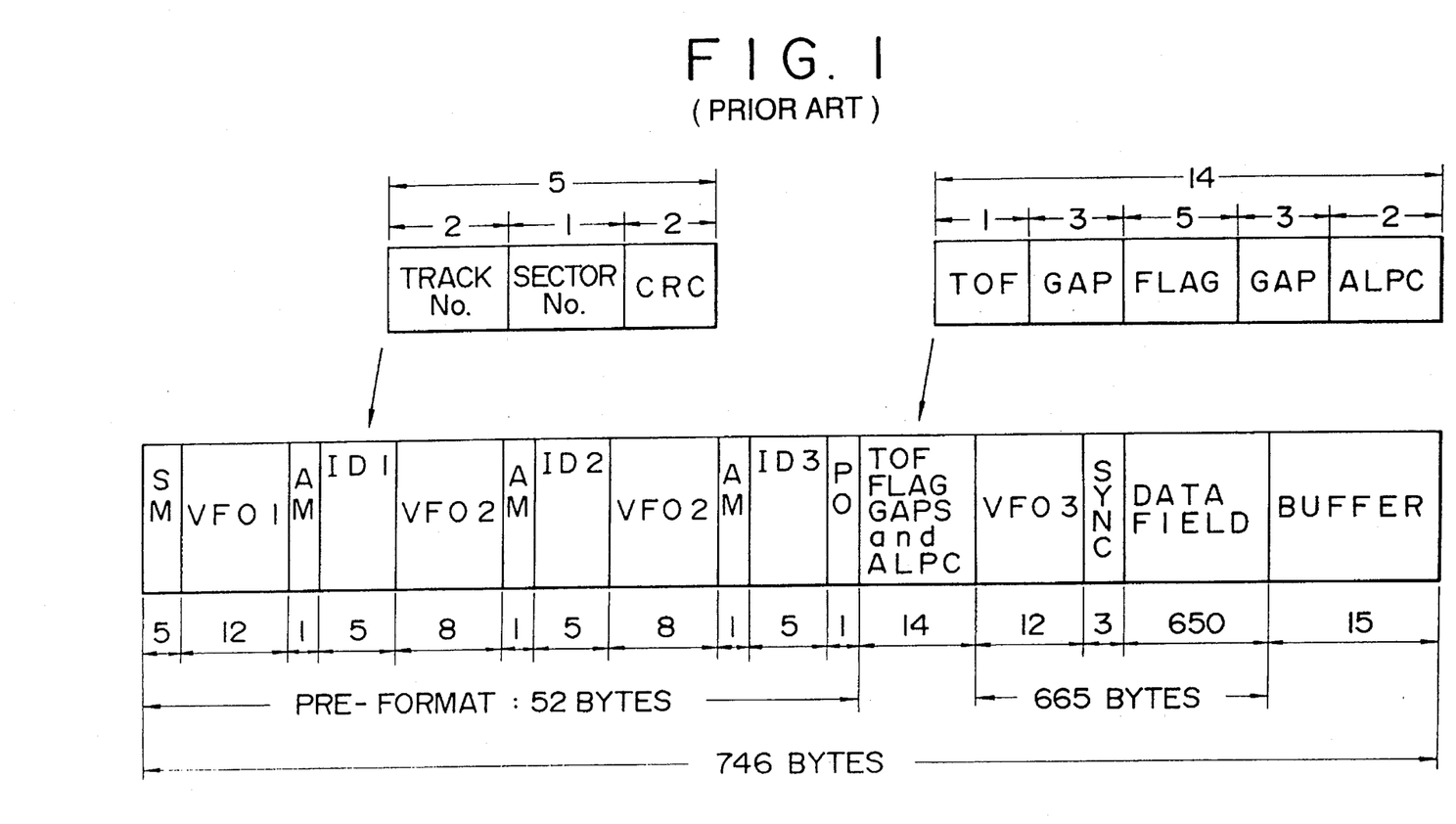
FIG. 1 is a diagrammatic view showing a sector format of a 5-inch magneto-optic disk of the 512 bytes/sector type of the CS system.

Conventionally, ISO (International Standardization Organization) formats for 3.5- and 5-inch magneto-optic (MO) disks have been proposed. FIG. 1 shows a sector format for a 5-inch magneto-optic disk of the 512 bytes/sector type wherein a CS (continuous servo) system is employed as a servo system.

Referring to FIG. 1, reference character "SM" denotes a sector mark. The pattern of the sector mark "SM" has a 5-byte length and is "$1^{10}0^6 1^6 0^{14} 1^6 0^6 0^6 1^{10} 0^2 1^1 0^2 1^1 0^2 1^1\ 0^1$". Here, $1^a$ and $0^b$ are channel bits and represent that "1" and "0" appear continuously by quantities a and b, respectively. Reference characters "VF01" to "VF03" denote each a VFO sink (PLL). The patterns of them are continuous patterns and individually such as follows:

| | |
|---|---|
| VF01 - | 010010010010 . . . 0010 (12 bytes) |
| VF02 - | 100100100100 . . . 0010 (8 bytes) |
| | 000100100100 . . . 0010 (8 bytes) |
| VF03 - | 010010010010 . . . 0010 (12 bytes) |

Reference character "AM" denotes an address mark. The pattern of it has a 2-byte length and is "0100100000000100".

Reference characters "ID1" to "ID3" denote each an address and have a same pattern. Each of the addresses "ID1" to "ID3" includes two bytes for a track number and one byte for a sector number recorded in the (2, 7) modulation. It further includes a CRC of 16 bits introduced therein and recorded in the (2, 7) modulation. A generating function of it is $$G(x) = x^{16} + x^{12} + x^5 + 1$$

Reference character "PO" denotes a postamble. A pro-format area thus ranges from the sector mark "SM" to the postamble "PO".

Subsequently to the pre-format area, "TOF", "FLAG", "GAP" and "ALPC" are disposed. "TOF" corresponds to a mirror face which has no groove thereon. "FLAG" denotes a flag representing that writing has been performed. A pattern to be set includes repetitions of "100" by 5 bytes. "FLAG" is protected by gaps "GAP" of 3 bytes at each of the front and rear thereof. "ALPC" denotes a controlling area for a laser power.

Reference character "SYNC" denotes a synchronizing signal for a data field. The pattern of it includes 3 bytes and is "010000100100001000100010010001001000001001001000". It is disposed subsequently to "VF03".

Reference character "DATA FIELD" denotes a data field in which user data are to be recorded, and has 650 bytes. It is disposed subsequently to the synchronizing signal "SYNC".

Reference character "BUFFER" denotes a margin for rotational jitters and includes 15 bytes. It is disposed subsequently to the "DATA FIELD".

In this manner, one sector is constituted from a total of 746 bytes beginning with the sector mark "SM" and ending with the margin "BUFFER".

Figure 2:
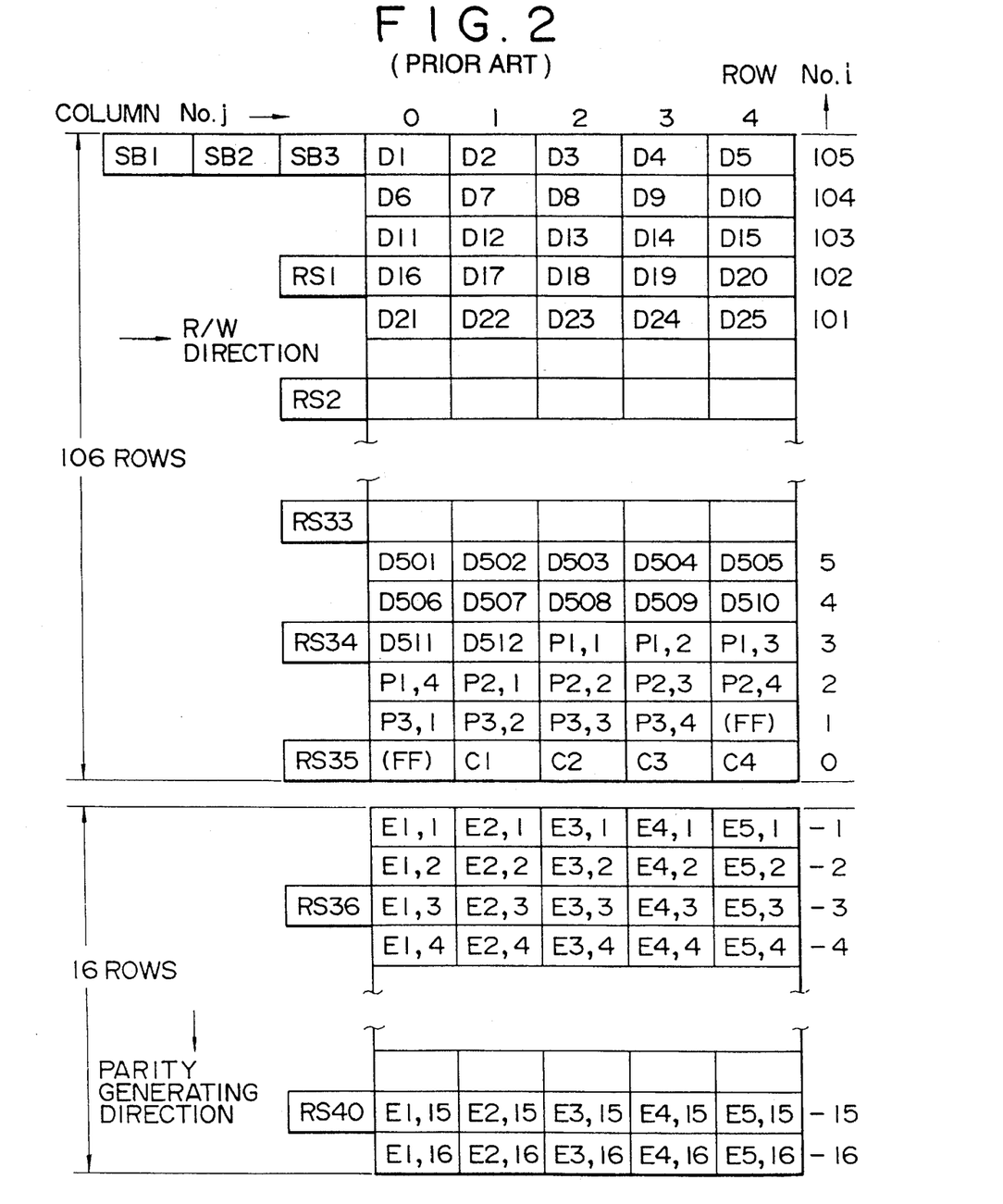
FIG. 2 is a diagrammatic view showing a data field of a 5-inch magneto-optic disk of the 512 bytes/sector type of the CS system.

FIG. 2 shows construction of the data field. Reference characters "SB1" to "SB3" denote synchronizing signals for the data field recorded in the synchronizing signal "SYNC" described above. Reference characters "RS1" to "RS40" denote each a re-sink and are disposed for each 10 bytes.

Reference character "D1" to "D512" denote each user data (512 bytes), which are disposed in a matrix having 5 columns such that they are arranged, for each successive 5 user data of 5 bytes, in successive rows in each of which they are successively arranged from the left to the right as seen in FIG. 2.

Reference characters "P1,1" to "P3,4" denote each control data (12 bytes) for exchanging operation and so forth, which are disposed in a similar manner subsequently to the user data. Reference character "(FF)" denotes a reserved area, and two such reserved areas (2 bytes) are disposed in a similar manner subsequently to the control data. Reference characters "C1" to "C4" denote each a CRC, and four such CRCs (4 bytes) are provided. The CRCs "C1" to "C4" are error detection codes for the user data "D1" to "D512", control data "P1,1" to "P3,4" and reserved areas "(FF)".

Reference characters "E1,1" to "E5,16" denote each a parity (ECC). The generating direction of the parities is the direction of a column. A (122, 106, 17) Reed-Solomon code×5 interleave is used. This code allows correction of errors of up to 8 bytes and allows correction for dissipation of errors of up to 16 bytes.

Figure 3A:
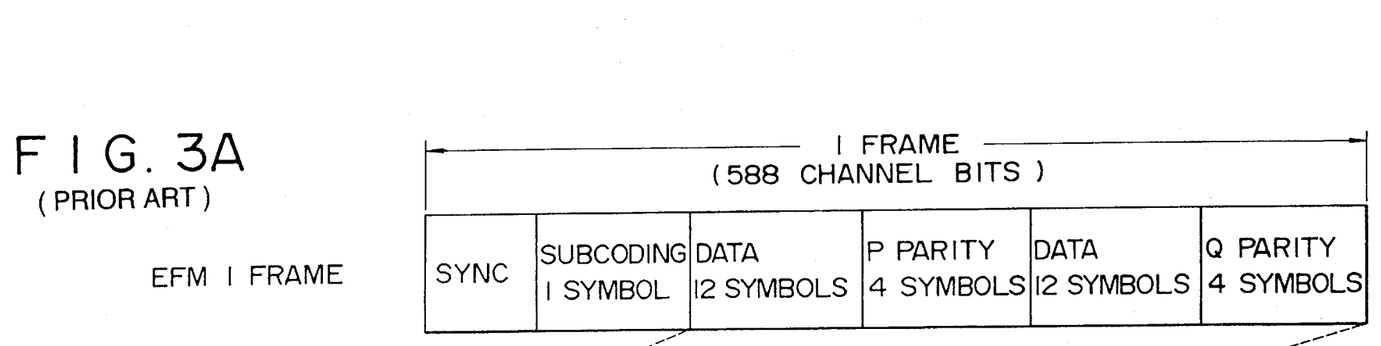
FIGS. 3A and 3B are diagrammatic views showing a frame format of a compact disk.

By the way, FIG. 3A shows a frame format of a compact disk (CD). Referring to FIG. 3A, the frame format includes a frame synchronizing signal SYNC of a 24-bit pattern, a subcoding of one symbol, data of 12 symbols, a P parity of 4 symbols, data of 12 symbols and a Q parity of 4 symbols disposed in this order. Here, one symbol includes 14 bits, and bits for the coupling between symbols (3 bits for each) are not shown. Such one frame corresponds to data of 6 samples (16 bits/sample) of two L and R channels sampled by 44.1 KHz.

Figure 4:
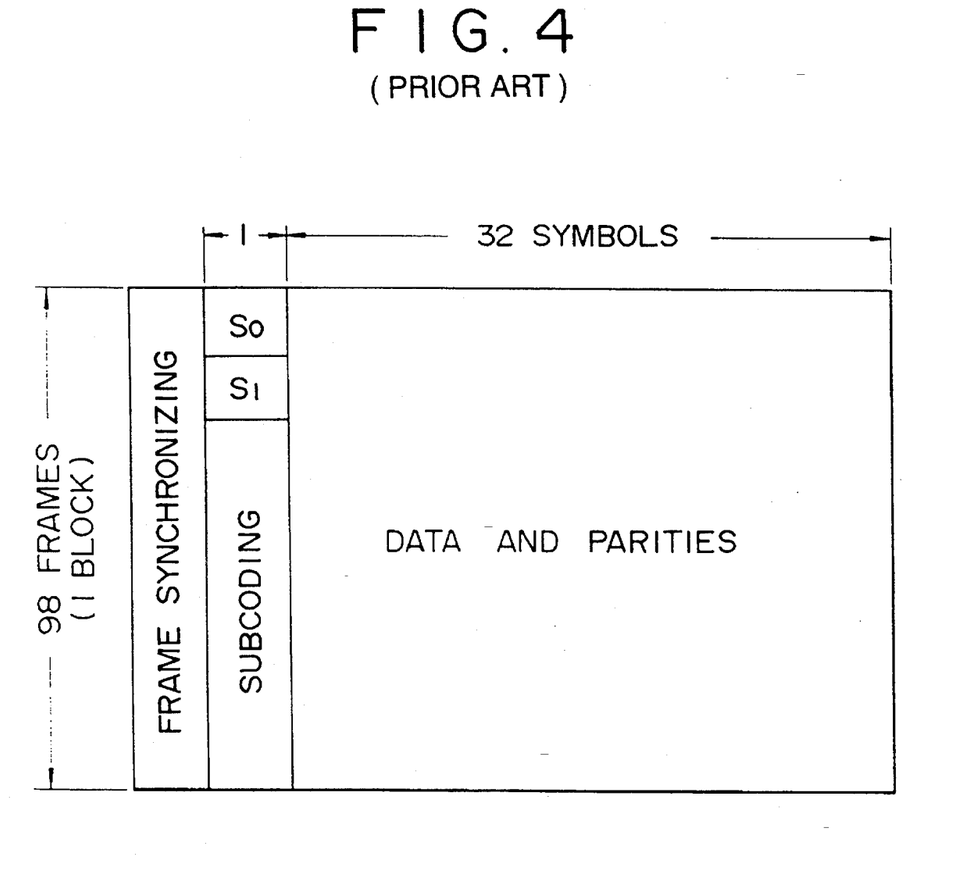
FIG. 4 is a diagrammatic view showing a block (sector) format of a compact disk.
Figure 5:
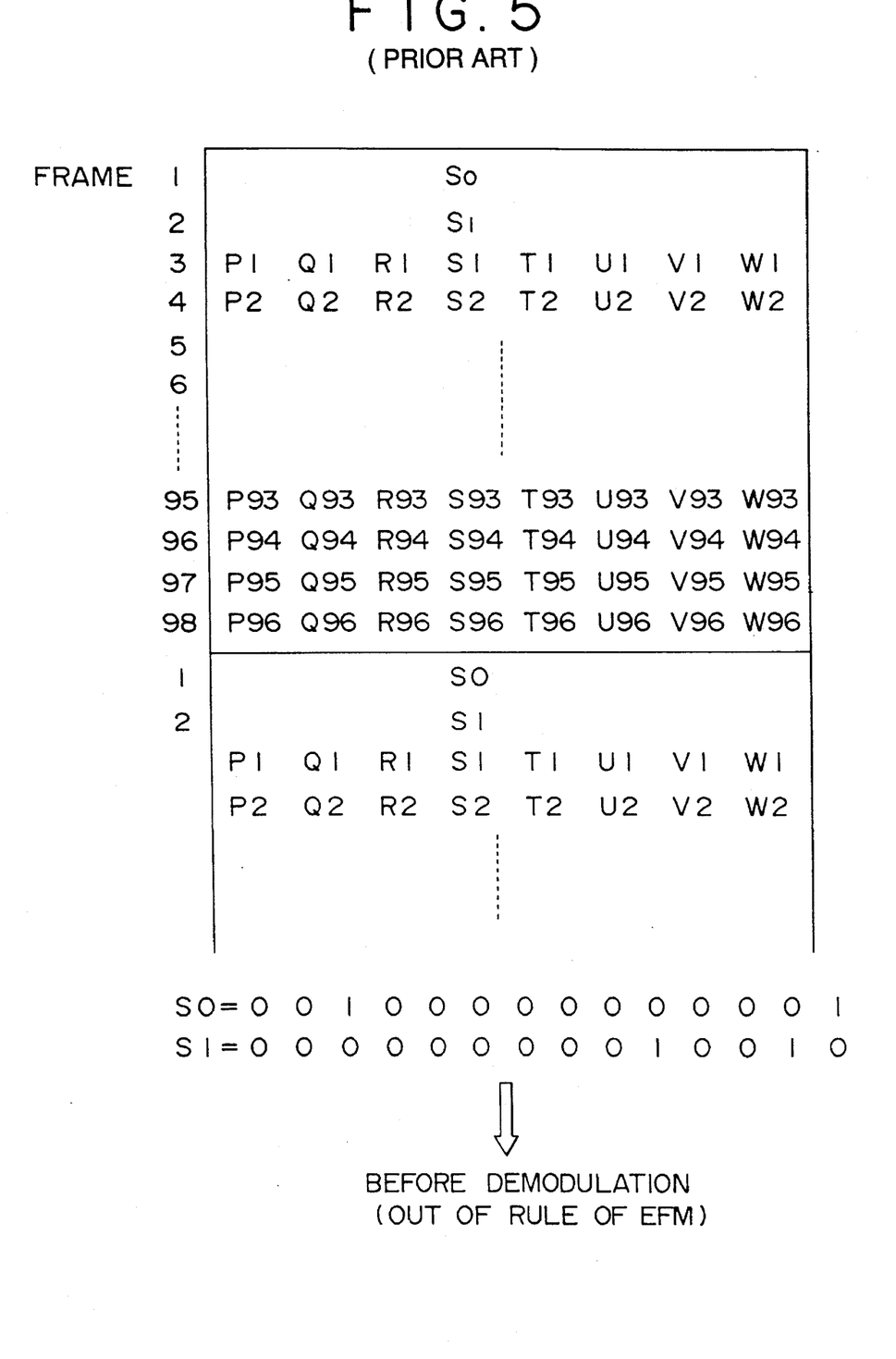
FIG. 5 is a diagrammatic view showing a subcoding format of a compact disk.

The subcoding includes 98 frames making up one block, which is illustratively shown in FIG. 4, while FIG. 5 shows a subcoding format. Referring to FIG. 5, one block is constituted from 96 bytes with two synchronizing patterns of $S_0$ and $S_1$ placed at the head thereof. Of 8-bit (after EFM demodulation) data P, Q, R, S, T, U, V and W of the third to 98th frames except the first and second frames corresponding to the synchronizing patterns $S_0$ and $S_1$, P and Q are used for accessing, and the remaining 6 bits of R to W are used to a special application for a still picture, a display of characters on a specific background or the like.

Figure 3B:
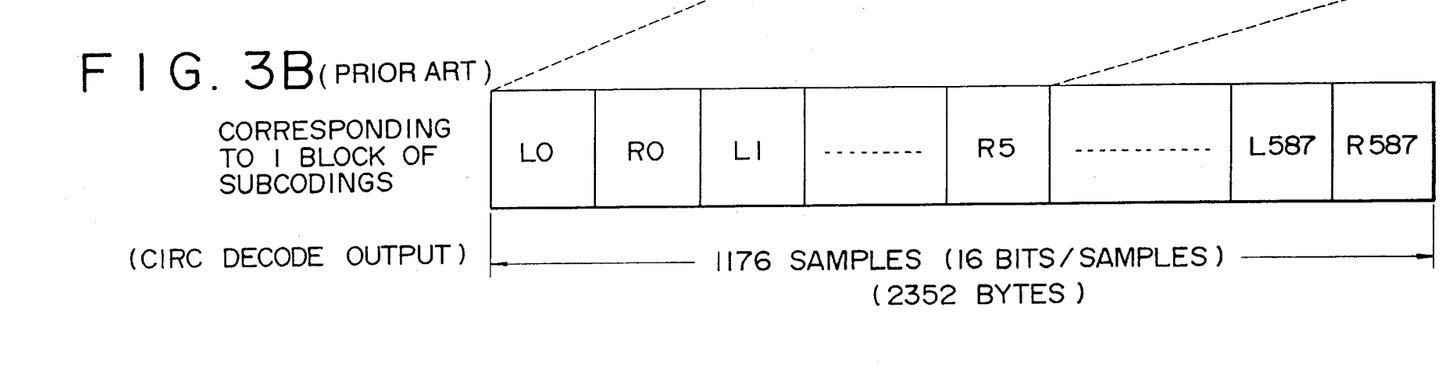

In the 98 frames (one sector) constituting one block of such subcoding, data of 588 samples (L0 to L587 and R0 to R587) of the two L and R channels, that is, 2,352 bytes (1 byte=8 bits) are included (FIG. 3B).

In this manner, the sector format for a magneto-optic disk and the block (sector) format for a compact disk both specified by the ISO standards are completely different from each other and cannot be commonly used simply.

SUMMARY OF THE INVENTION

It is an object of the present invention to provide a recording method by which, for example, data of a compact disk can be recorded well onto a magneto-optic disk of the ISO format.

In order to attain the object, according to an aspect of the present invention, there is provided a data recording method for recording, onto a record medium specified for recording data of a sector size A thereon, data of a different sector size B, which comprises the steps of adding, in order to record mB data into a record unit area of the record medium consisting of n sectors, n being an integral number equal to or greater than 1, m being an integral number which is equal to or greater than 1 and satisfies the relationship of nA>mB, at least an error correction code or an error detection code to the mB data using the region of nA−mB of the record unit area of the record medium, and recording the resultant data into the record unit area of the n sectors of the record medium.

According to another aspect of the present invention, there is provided a data recording method for recording, onto a record medium specified for recording data of a sector size A thereon, data of a different sector size B, which comprises the steps of dividing, in order to record mB data into a record unit area of the record medium consisting of n sectors, n being an integral number equal to or greater than 1, m being an integral number which is equal to or greater than 1 and satisfies the relationship of nA>mB, the mB data into a plurality of data groups, adding at least an error detection code to each of the data group using the region of nA−mB of the record unit area of the record medium, and recording the resultant data into the record unit area of the n sectors of the record medium.

For example, the sector size of a 5-inch magneto-optic disk (ISO format) of the 512 bytes/sector type of the CS system is 610 bytes. On the other hand, for example, data included in one sector (98 frames) of a compact disk are 2,352 bytes, and subcodings of P to W are 96 bytes. Consequently, when data of a compact disk are to be recorded onto a magneto-optic disk, for example, data (2,352 bytes) of the compact disk for one sector as well as subcodings (96 bytes) are recorded into 5 sectors (3,050 bytes=610 bytes×5) of the magneto-optic disk.

Then, using the remaining area of 698 bytes (3,050 bytes−2,352 bytes) or of, in case subcodings are involved, 602 bytes (3,050 bytes−2,448 bytes), an error connection code or an error detection code is added. Consequently, data of a record medium can be recorded with a high degree of accuracy onto another medium of a different sector size, and for example, data of a compact disk can be recorded onto a magneto-optic disk. Such is suitable also for interpolation.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENT

A data recording method of the present invention will be described subsequently by way of a preferred embodiment wherein it is applied to recording of data of a compact disk onto a 5-inch magneto-optic disk (ISO format) of the 512 bytes/sector type of the CS system.

As described hereinabove, the sector size of a magneto-optic disk is a total of 610 bytes including 512 bytes of user data, 12 bytes of control data, 2 bites of reserved areas, 4 bytes of CRCs and 80 bytes of parities (refer to FIG. 2).

On the other hand, one sector (98 frames) of a compact disk includes 2,352 bytes of data and 96 bytes of subcodings P to W as described hereinabove.

Figure 6:
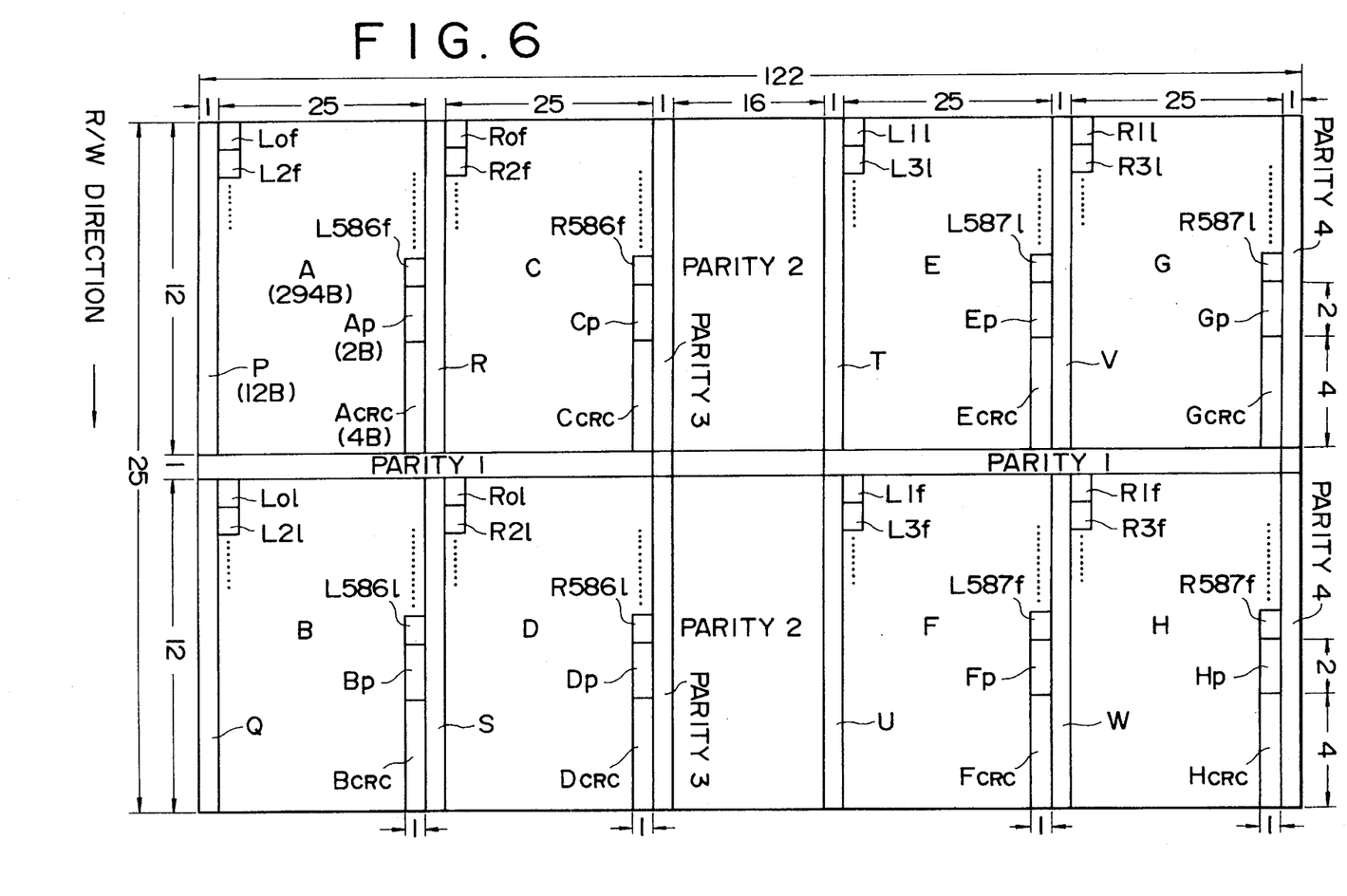
FIG. 6 is a diagrammatic view showing a data format when data of a compact disk are recorded onto a magneto-optic disk.

Thus, in the present embodiment, data (2,352 bytes) for one sector of a compact disk and subcodings (96 bytes) are recorded into 5 sectors of a magneto-optic disk. FIG. 6 shows a format of compact disk data recorded into 5 sectors (3,050 bytes) of a magneto-optic disk.

Referring to FIG. 6, each of reference characters A to H denotes user data of 294 bytes, and they are arranged in a matrix having 12 rows such that they are arranged, for each successive 12 user data of 12 bytes, in successive columns in each of which they are successively arranged from the top to the bottom as seen in FIG. 6. The user data A, C, E and G are disposed in this order in the horizontal direction, and also the user data B, D, F and H are disposed in this order in the horizontal direction. The user data A, C, E and G and the user data B, D, F and F are disposed in this order in the vertical direction, respectively.

The user data A are upper order bits (L0f, L2f, ... , L586f) of even-numbered data of the left channel. The user data B are lower order bits (L0l, L2l, ... , L586l) of even-numbered data of the left channel. The user data C are upper order bits (R0f, R2f, ... , R586f) of even-numbered data of the right channel. The User data D are lower Order bits (R0l, R2l, ... , R586l) of even-numbered data of the right channel. The user data E are lower order bits (L1l, L3l, ... , L587l) of odd-numbered data of the left channel. The user data F are Upper order bits (L1f, L3f, ... , L587f) of odd-numbered data of the left channel. The user data G are lower order bits (R1l, R3l, ... , R587l) of odd-numbered data of the right channel. The user data H are upper order bits (R1f, R3f, .... R587f) of odd-numbered data of the right channel. Here, the suffix f denotes upper order bits (1 byte), and the suffix l denotes lower order bits (1 byte).

The subcodings P to W of 12 bytes are disposed in the vertical direction (in vertical column) in front of the user data A to H, respectively. Further, subsequently to the user data A to H, areas of 2-byte control data AP to HP are provided, respectively, and 4-bytes of CRCs ACRC to HCRC are disposed therefor, respectively. In the areas of the control data AP to HP, for example, empty bits or CRCs, control data for the user data A to H, control data for the entire system or the like are disposed. The CRCs ACRC to HCRC are error detection codes for the user data A to H and control data AP to HP, respectively.

Further, parities 3 are disposed adjacent or subsequently to the user data C and D. The parities 3 are provided for the user data A to D, control data AP to DP and CRCs ACRC to DCRC. The generating direction of the parities 3 is a horizontal direction, and a simple parity of EXOR (53, 52, 2) is used.

Similarly, parities 4 are disposed adjacent or subsequently to the user data G and H. The parities 4 are provided for the user data E to H, control data EP to HP and CRCs ECRC to HCRC. The generating direction of the parities 4 is a horizontal direction, and a simple parity of EXOR (53, 52, 2) is used.

Parities 2 are disposed between the parities 3 and the subcodings T and U. The parities 2 are provided for the user data A to H, control data AP to HP, CRCs ACRC to HCRC, parities 3 and parities 4. The generating direction of the parities 2 is a horizontal direction, and a (122, 106, 17) Reed-Solomon code×25 interleave is used. This code allows correction of errors of up to 8 bytes without a dissipation or correction of up to 16 bytes when there is a dissipation.

Further, parities 1 are disposed between the user data A, C, E and G and the user data B, D, F and H. The parities 1 are provided for the user data A to H, control data AP to HP, CRCs ACRC to HCRC, parities 2, parities 3 and parities 4. The generating direction of the parities 1 is a vertical direction, and a simple parity of EXOR (25, 24, 2) is used.

In this manner, in the data format of FIG. 6, data of a compact disk include 2,352 bytes (A to H); subcodings include 96 bytes (P to W); control data include 16 bytes (AP to HP); CRCs include 32 bytes (ACRC to HCRC); and parities include 554 bytes (parities 1 to parities 4), and a total of 3,050 bytes is involved and corresponds to 5 sectors (3,050 bytes) of a magneto-optic disk. The data of 3,050 bytes are recorded across 5 sectors of a magneto-optic disk in a vertical recording direction (R/W direction). In short, 610 bytes (sector size) are recorded into each sector.

In this manner, according to the present embodiment, data (2,352 bytes) for one sector of a compact disk and subcodings (96 bytes) are recorded in a unit of 5 sectors (3,050 bytes) of a 5-inch magneto-optic disk (ISO format) of the 512 bytes/sector type of the CS system. Since the CRCs ACRC to HCRC and parities 1 to 4 are disposed in the remaining area, detection of an error of data of a compact disk and subcodings and correction of such error can be performed well.

Further, according to the present embodiment, since data for one sector of a compact disk, in short, data (L0 to L587 and R0 to R587) of 588 samples for each of the left and right, are divided into and disposed as user data A to H and CRCs ACRC to HCRC are added to them, respectively, an error condition can be detected for each of the divisional data. Accordingly, when there is an error in data, it is not necessary to determine all the data to be of no good, and in case the data have a high correlation such as audio data, correct data can be obtained by interpolation from adjacent correct data.

Further, according to the present embodiment, since data for one sector of a compact disk are divided into user data A to H and even-numbered data (L0, L2, ..., L586, and R0, R2 ..., R586) are disposed in the user data A to D while odd-numbered data (L1, L3, ..., L587, and R1, R3 ..., R587) are disposed in the user data E to H and parities 2 are disposed between them, the distance between the even-number data and the odd-numbered data can be made great, which can reduce otherwise possible simultaneous damage to both of them arising from a burst error. Consequently, even if one of them is damaged to make an error, it can be interpolated from the other data.

Further, according to the present embodiment, since the length in a vertical direction is 25 bytes and data are recorded successively in the vertical direction, the depth of the interleave is 25 bytes. Consequently, errors arising from a great burst error can be corrected effectively with the parities 2.

It is to be noted that, while, in the embodiment described hereinabove, data (2,352 bytes) of a compact disk and subcodings (96 bytes) are recorded into 5 sectors (3,050 bytes=610 bytes×5) of a 5-inch magneto-optic disk of the 512 bytes/sector type of the CS system, alternatively all data (3,234 bytes=33 bytes×98) of a compact disk including error correction codes (784 bytes=8 bytes×98) may be recorded into 6 sectors (3,660 bytes=610 bytes×6) of a magneto-optic disk. In this instance, the number of the remaining bytes is 426 bytes (3,660 bytes−3,234 bytes), and error correction codes or error detection codes will be added using the area.

Further, while, in the embodiment described above, the sector size of a 5-inch magneto-optic disk of the 512 bytes/sector type of the CS system is described to be 610 bytes (all data), the sector size may otherwise be considered to be 530 bytes only of data (information data) except for error correction codes, and also it can be considered that the sector size is 512 bytes only of user data (refer to FIG. 2). Similarly, also the sector size of a compact disk can be considered to include three kinds including 3,234 bytes of all data, 2,448 bytes of data and subcodings (information data), and 2,352 bytes only of data.

As relationships between the three sector sizes of a (610 bytes), a' (530 bytes) and a" (512 bytes) of a magneto-optic disk and three sector sizes of b (3,234 bytes), b' (2,448 bytes) and b" (2,352 bytes) of a compact disk, there are nine relationships including a-b, a-b' (embodiment), a-b", a'-b, a'-b', a'-b", a"-b, a"-b' and a"-b" available.

Figure 7:
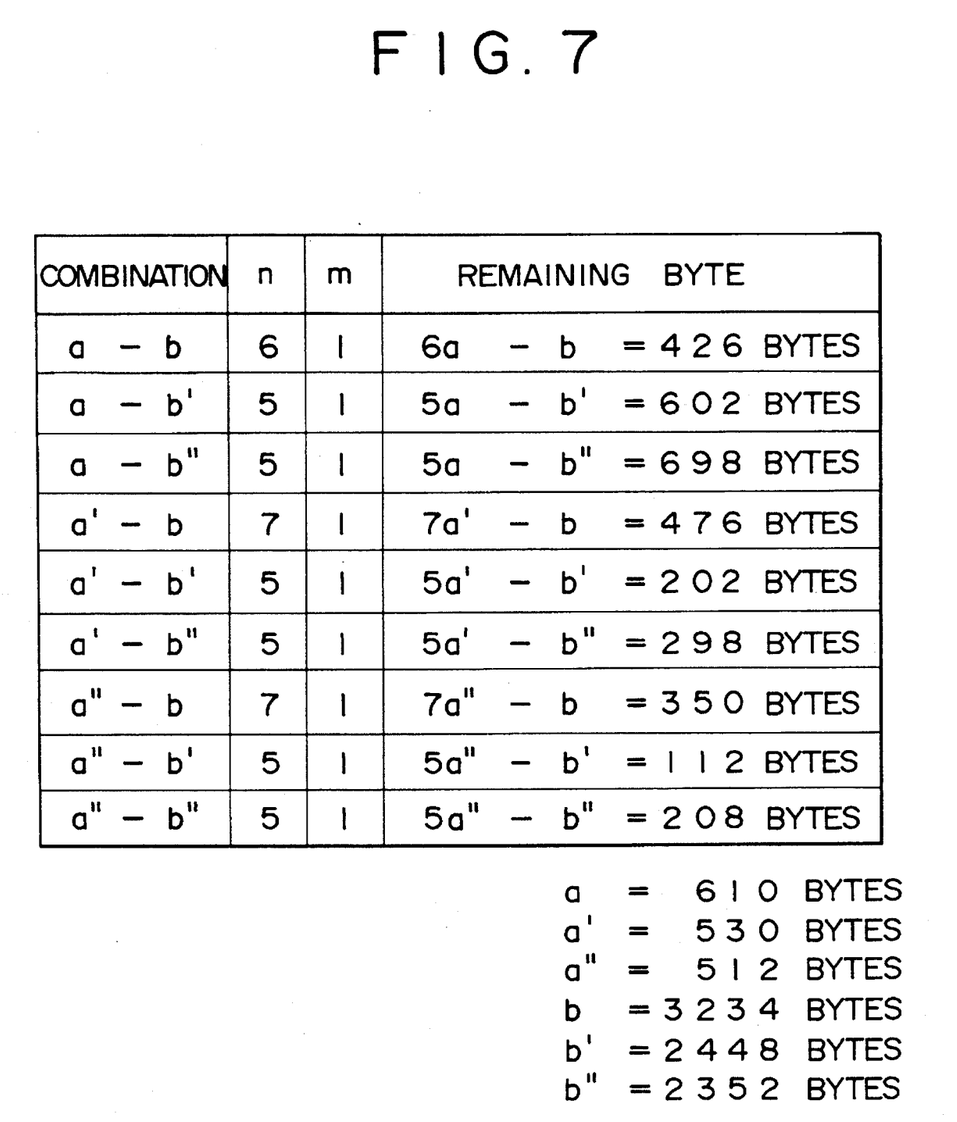
FIG. 7 is a diagrammatic view showing several combinations of individual sector sizes of a magneto-optic disk and a compact disk.

FIG. 7 shows an example of a unit sector number n of a magneto-optic disk and a sector number m of a compact disk to be recorded onto the magneto-optic disk in the individual relationships.

For example, in the relationship of a'-b', data for one sector (2,448 bytes) of a compact disk are recorded into 5 sectors (2,650 bytes=530 bytes×5) of a magneto-optic disk. Then, using the remaining area of 202 bytes (2,650 bytes−2,448 bytes), error correction codes or error detection codes are added.

Further, while, in the embodiment described above, data of a compact disk are recorded onto a 5-inch magneto-optic disk of the 512 bytes/sector type of the CS system, the present invention can be applied similarly also to recording onto a magneto-optic disk of the SF system (sample servo system), or onto a 3.5-inch size magneto-optic disk or a magneto-optic disk of the 1,024 bytes/sector type.

For example, the case is considered wherein data of a compact disk are to be recorded onto a 3.5-inch size magneto-optic disk of the 512 bytes/sector type of the CS system. In this instance, a portion of 106 rows in FIG. 2 is replaced by another portion of 104 rows, and the sector size is changed to 600 bytes. Thus, for example, data of 3,000 bytes should be produced excepting the parities 3 and parities 4 of FIG. 6 and recorded across 5 sectors of a magneto-optic disk.

Further, while, in the embodiment described above, data of a compact disk are recorded onto a magneto-optic disk, the present invention can be applied similarly to any other case of recording onto a medium having a different sector size.

Having now fully described the invention, it will be apparent to one of ordinary skill in the art that many changes and modifications can be made thereto without departing from the spirit and scope of the invention as set forth herein.

What is claimed is:

1. A method of recording, onto a preformatted disk shaped magneto-optic record medium having a sector size A, digital data formatted in a different sector size B, comprising the steps of:

detecting digital data formatted into m sectors having a sector size B, where m is an integral number of at least 1;

reformatting m sectors of digital data having a sector size B into n sectors of digital data having a sector size A, where n is an integral number of at least 1 and where the product of n and A is greater than the product of m and B;

adding to the reformatted digital data at least one of an error correction code and an error detection code, the selected code for each A sized sector positioned within a region of the A sized sector corresponding to the difference of the product of n and A and the product of m and B; and recording the reformatted digital data and the selected code onto the n sectors of the preformatted disk shaped magneto-optic record medium, the preformatted record medium having at least one preformatted address within each sector.

2. A method of recording according to claim 1, wherein user digital data is reformatted from m sectors of digital data having a sector size B into units of 512 bytes within each of the n sectors having sector size A.

3. A method of recording according to claim 2, wherein digital data is detected from 98 frames within each of the m sectors having sector size B.

4. A method of recording according to claim 3, further comprising the steps of:

dividing digital data within the 98 frames into a plurality of digital data groups; and adding at least one of the error correction code and the error detection code to the digital data within each of the digital data groups.

5. A method of recording according to claim 4, further comprising the step of:

separating digital data belonging to an odd-numbered channel from digital data belonging to an even-numbered channel.

6. A method of recording according to claim 5, wherein the plurality of data groups are divided into at least one odd-numbered digital data group and at least one even-numbered digital data group, and at least one parity for error correction is added between adjacent digital data groups.

7. A method of recording, onto a preformatted disk shaped magneto-optic record medium having a sector size A, digital data formatted in a different sector size B, comprising the steps of:

detecting digital data from m sectors having a sector size B, where m is an integral number of at least 1;

dividing digital data for each of the m sectors into a plurality of digital data groups, the digital data groups consisting of n sectors having a sector size A, where n is an integral number of at least 1 and where the product of n and A is greater than the product of m and B;

adding to each digital data group at least an error detection code, the error detection code positioned within a region of the A sized sector corresponding to the difference between the product of n and A and the product of m and B; and recording each digital data group and its associated error detection code onto n sectors of the preformatted disk shaped magneto-optic record medium, the preformatted disk shaped magneto-optic record medium having at least one preformatted address within each sector.

8. A method of recording according to claim 7, further comprising the step of:

separating digital data belonging to an odd-numbered channel from digital data belonging to an even-numbered channel.

9. A method of recording according to claim 7, wherein the plurality of digital data groups are divided into at least one odd-numbered digital data group and at least one even-numbered digital data group, and at least one parity for error correction is added between adjacent digital data groups.

10. A method of recording according to claim 4, further comprising the step of:

separating odd-numbered digital data from even-numbered digital data.

11. A method of recording according to claim 7, further comprising the step of:

separating odd-numbered digital data from even-numbered digital data.

* * * * *